United States Patent [19]

Hughes

[11] 4,176,677

[45] Dec. 4, 1979

[54] RELAY PILOT REGULATOR

[75] Inventor: George C. Hughes, Anderson, Ind.

[73] Assignee: Textron Inc., Providence, R.I.

[21] Appl. No.: 859,041

[22] Filed: Dec. 9, 1977

[51] Int. Cl.² .............................................. G05D 16/06
[52] U.S. Cl. ................................ 137/488; 137/596.18;
137/627.5
[58] Field of Search ..................... 137/492.5, 492, 488,
137/102, 627.5, 596.18

[56] References Cited

U.S. PATENT DOCUMENTS

| | | | |
|---|---|---|---|
| 2,624,980 | 1/1953 | Hughes | 137/492.5 |
| 3,948,045 | 4/1976 | Budinski | 137/627.5 X |

*Primary Examiner*—Alan Cohan
*Attorney, Agent, or Firm*—Wooster, Davis & Cifelli

[57] ABSTRACT

A relay pilot regulator for use in combination with a main regulator in a gas distribution system, the gas distribution system including an inlet conduit supplying gas at an inlet pressure and an outlet conduit for delivering gas at a reduced outlet pressure, the main regulator including a main valve controlling gas flow from the inlet conduit to the outlet conduit and thereby also controlling the outlet pressure, a main regulator diaphragm mechanically linked to the main valve and a loading chamber the loading pressure in which acts on the main regulator diaphragm wherein the loading pressure positions the main regulator diaphragm and the main valve, the relay pilot regulator providing and controlling the loading pressure in the loading chamber. The relay pilot regulator includes a relay pilot regulator diaphragm adjustably spring biased against the outlet pressure for movement in response to changes therein, and is characterized by a slideably mounted unloading valve for bleeding pressure from the loading chamber and a loading valve slideably mounted to the unloading valve for controlling delivery of gas at the inlet pressure to the loading chamber. The unloading valve and loading valve share the same mechanical linkage, which is preferably a pivotally mounted L-shaped lever linkage connecting the loading valve and unloading valve to the relay pilot regulator diaphragm. The relay pilot regulator has quick response to changes in the outlet pressure and acts to adjust the loading pressure to restore the outlet pressure to a given desired level.

11 Claims, 6 Drawing Figures

RELAY PILOT REGULATOR

BACKGROUND OF THE INVENTION

This invention relates to a relay pilot regulator for operating a main regulator, and in particular, to a relay pilot regulator having a combined loading and unloading valve which share a common operating linkage.

In fluid pressure systems, such as gas distribution systems, it is desirable to utilize a pressure regulator system which receives gas at an inlet pressure and regulates the flow of gas to provide and maintain a desired adjusted outlet pressure despite variations in downstream demand.

A pertinent prior art regulator system is described in U.S. Pat. No. 2,624,980. That system comprises a main regulator section including a main valve which is adjusted between its opened and closed position by a main regulator diaphragm connected to the main valve through a mechanical linkage. The main regulator diaphragm is subjected to the outlet pressure on one of its sides, and the outlet pressure tends to move the main regulator diaphragm to close the main valve. The other side of the main regulator diaphragm is subjected to a loading pressure, which tends to move the main regulator diaphragm to open the main valve. The main valve is also spring biased, and it is a balance of the spring, loading pressure and outlet pressure which determines the position of the main valve. A relay pilot regulator of the prior art system controls the loading pressure applied to one side of the main regulator diaphragm. The relay pilot regulator also comprises a diaphragm, which is spring biased against the outlet pressure. The relay pilot diaphragm is mechanically linked, through a double toggle linkage, to two separate and distinct valves. One of the valves, when open, supplies inlet gas to the loaded side of the main regulator diaphragm, thus increasing the loading pressure. This occurs when the outlet pressure has fallen below the desired level, and the increase in the loading pressure causes the main valve to open more, thereby increasing the outlet pressure to the desired level. The second valve is opened when the outlet pressure is too great, and operates to vent the loading pressure and thus decrease it, causing the main valve to move towards its closed position and reduce the outlet pressure.

The foregoing structure, although providing a workable regulator system, nevertheless, has some disadvantages. The relay pilot regulator requires two separate valve structures and two separate passageways, one for supplying the loading pressure and the other for venting the loading pressure. The double toggle linkage connecting the two separate valves is relatively complex and requires careful manufacturing and adjustment to achieve operation as intended, and the response of the relay pilot regulator is slower than desired because of the complex structure. Slower response time of the relay pilot regulator results in cycling of the main regulator as it seeks a main valve position for providing outlet gas at the desired outlet pressure, and this is undesirable. The improvements which would be desirable over the prior art pilot regulator are more simplified structure and faster response time.

Other relay pilot operated fluid pressure regulator systems have also been used, and in general they have been even more complex, some even requiring two diaphragms in the relay pilot regulator.

SUMMARY OF THE INVENTION

Accordingly, it is a principal object of the invention to provide an improved relay pilot regulator for a relay pilot operated fluid pressure regulator system.

It is an additional object of the invention to provide a relay pilot regulator for a relay pilot operated fluid pressure regulator system wherein the relay pilot regulator has fast response to changes in the outlet pressure and minimizes cycling of the main regulator.

It is another object of the invention to provide a relay pilot regulator for a relay pilot operated fluid pressure regulator system wherein the loading valve and unloading valve of the relay pilot regulator are interconnected to operate from a single linkage, thus achieving fast response.

It is a further object of the invention to provide a relay pilot regulator for a relay pilot operated fluid pressure regulator system wherein the structure of the relay pilot regulator is simplified.

The relay pilot regulator according to the invention herein is used in conjunction with a main regulator of the type generally described above, and the relay pilot regulator comprises a pilot regulator diaphragm which is positioned by the outlet pressure from the gas distribution system. A single pivotally mounted linkage lever translates movement of a relay pilot regulator diaphragm to a combined loading and unloading valve structure. A load/unload passage connects the loading chamber of the main regulator to the relay pilot regulator, and an inlet passage connects the gas at its inlet pressure to the relay pilot regulator, these two passages intersecting within the relay pilot regulator. An additional unload passage connects the intersection of the inlet and load/unload passages with the adjusted outlet pressure, preferably by connecting them with the space under the relay pilot diaphragm. A loading valve and an unloading valve are mounted at the intersection of the three passages to selectively connect and block the passages in response to movement of the relay pilot diaphragm in order to provide and maintain a loading pressure in the main regulator loading chamber necessary for achieving the desired adjusted outlet pressure of the regulator system. More particularly, the unloading valve preferably comprises a finned valve stem slideably mounted in the unload passage such that gas may pass between the fins along the outside of the valve stem, and a valve disc is mounted at the end of the valve stem for cooperating with a valve seat to prevent gas from passing through the unload passage unless the unloading valve is open against a valve spring biasing it toward its closed position. The finned valve stem of the unloading valve is tubular, thus defining an axial opening in which the loading valve is slideably mounted. The loading valve comprises a valve stem slideably mounted in the tubular stem of the unloading valve, and further comprises a valve face at one end of the stem which seats against a resiliently mounted inlet orifice of the inlet passage when the loading valve is closed. The other end of the loading valve stem is connected with the linkage lever, preferably by means of a slot in the loading valve stem receiving the linkage lever adjacent to the end of the unloading valve stem.

Thus, when the outlet pressure is low, the relay pilot regulator diaphragm drops and the linkage lever pulls the loading valve open, permitting a flow of high pressure inlet gas to the loading chamber of the main regulator through the load/unload passage. When the outlet pressure rises to the desired adjusted level, the relay pilot regulator diaphragm also rises and closes the loading valve. If the outlet pressure rises above the desired level, the relay pilot regulator diaphragm also rises and pivots the linkage lever to drive the unloading valve open. The loading valve is carried with the unloading valve and is driven against the resiliently mounted inlet orifice which maintains the loading valve closed. Thus, the loading pressure from the loading chamber can escape to the outlet side of the regulator system. It will be noted that a single linkage lever thus controls both the unloading valve and the loading valve, and this permits a smooth transition among the conditions in which (1) the loading valve is open and the unloading valve is closed, (2) both the loading valve and unloading valve are closed, and (3) the unloading valve is open and the loading valve is closed. The transitions among these conditions also occur rapidly under fast changing demand conditions, wherein the pilot relay regulator according to the invention herein has a very quick response.

Other features and objects of the invention will in part be obvious to those skilled in the art and will in part be clear from a perusal of the following description of the preferred embodiment and the claims, taken together with the drawings.

DRAWINGS

The same reference numerals refer to the same elements throughout the various figures.

DESCRIPTION OF PREFERRED EMBODIMENT

Figure 1:
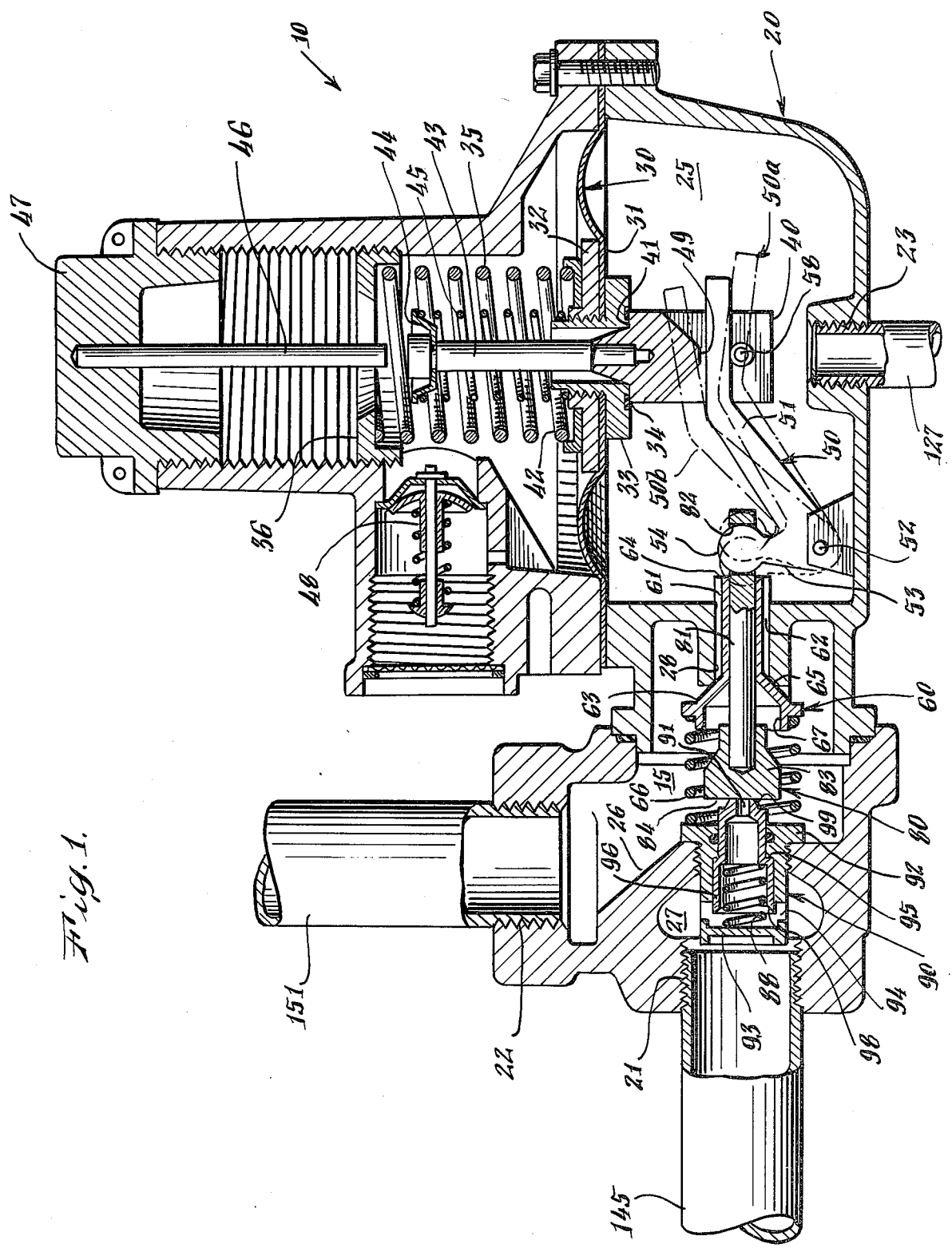
FIG. 1 is a sectional view of a relay pilot regulator according to the invention herein.
Figure 5:
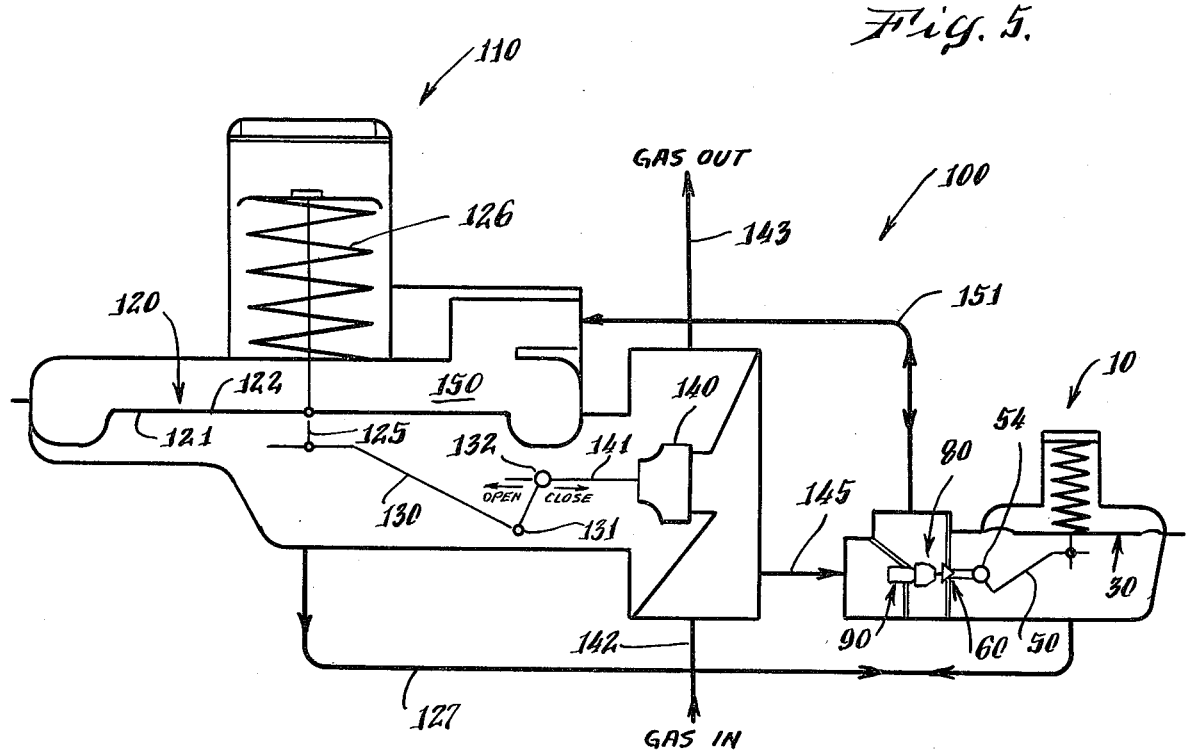
FIG. 5 is a schematic view of a relay pilot regulator of FIG. 1 in conjunction with a main regulator in a gas distribution system.

The relay pilot regulator 10 is shown in FIG. 1, and most generally comprises a housing 20. Before describing the relay pilot regulator 10 in detail, reference should be had to FIG. 5 illustrating the relay pilot regulator 10 connected in a regulator system 100 for a gas distribution network. The regulator system 100 includes a main regulator 110 comprising a main regulator diaphragm 120. The main regulator diaphragm 120 is connected by a rod 125 to an L-shaped linkage lever 130 which is pivotally mounted at 131 and is also connected at 132 to the valve stem 141 of a main valve 140, wherein the main regulator diaphragm 120 operates the main valve 140 through the linkage lever 130. Gas at an inlet pressure higher than the desired adjusted outlet pressure of the system is supplied to the inlet side of the main valve 140 by an inlet conduit 142. The gas passes through the main valve 140, when it is open, to provide a supply of gas at an adjusted outlet pressure, the outlet pressure being controlled by the extent to which the main valve 140 is open. The gas at the adjusted outlet pressure exits the regulator system through a supply conduit 143.

As noted above, the position of the main regulator diaphragm 120 controls the position of the main valve 140, and several forces act to position the main diaphragm 120. First, a main regulator diaphragm biasing spring 126 is provided, and absent all other forces, the biasing spring 126 acts to pull the main regulator diaphragm up and close the main valve 140. Second, the outlet pressure is supplied from the outlet side of the main valve 140 to the underside 121 of the main regulator diaphragm 120, and the outlet pressure also acts to drive the main regulator diaphragm 120 upwardly and close the main valve 140. Third, a loading pressure is contained in a loading chamber 150 and the loading pressure acts on the top 122 of the main regulator diaphragm 120 and the loading pressure tends to drive the main regulator diaphragm 120 downwardly to open the main valve 140. It will be appreciated that the adjusted outlet pressure is lower than the input pressure, and the loading pressure is between the input and output pressures.

The loading pressure within the loading chamber 150 is supplied and controlled by the relay pilot regulator 10, which, with reference to FIGS. 1 and 5, is connected with the main regulator 110 as follows. The inlet pressure is supplied to the relay pilot regulator 10 by an inlet conduit 145 extending from the inlet side of the main valve 140 to an opening 21 in the housing 20 of the relay pilot regulator 10. A load/unload conduit 151 extends from the loading chamber 150 to the relay pilot regulator 10, entering its housing 20 at threaded opening 22. The outlet pressure is conducted from the underside of the main diaphragm 120 to the relay pilot regulator 10 by a control conduit 127 which enters the housing 20 at opening 23.

Figure 6:
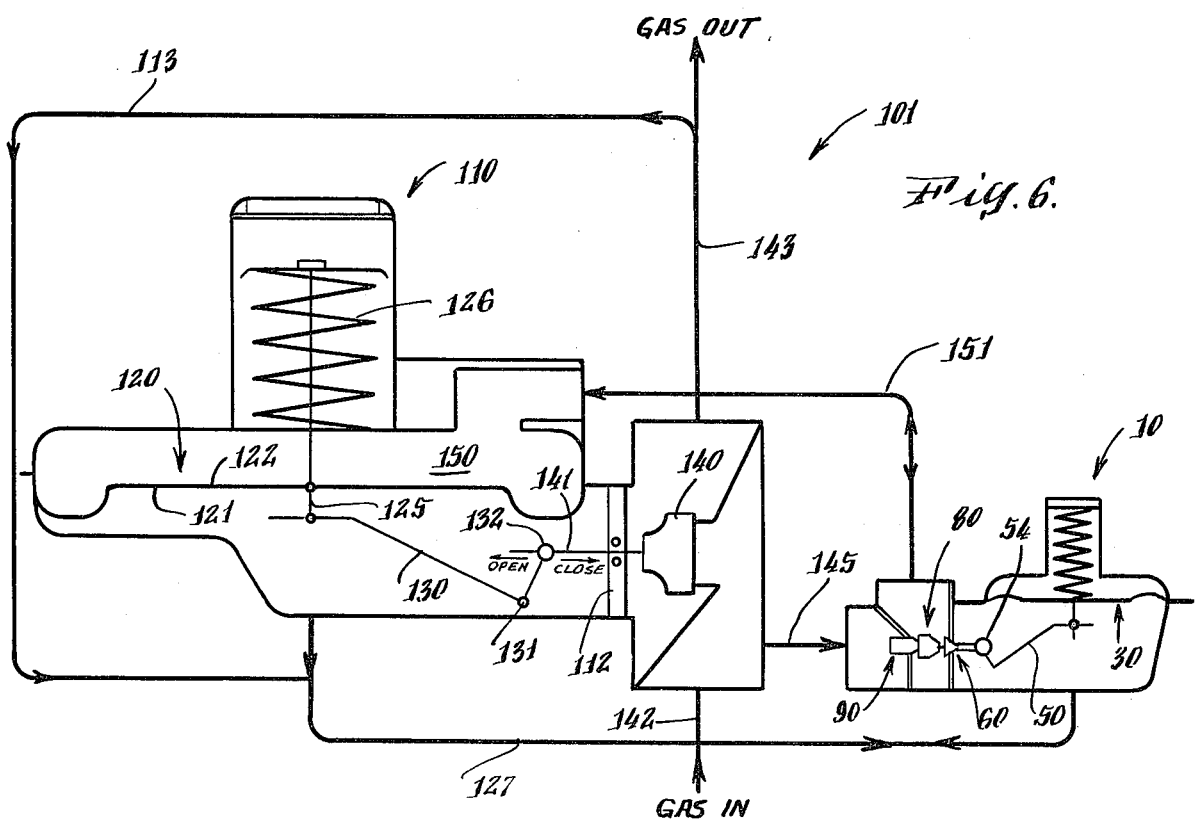
FIG. 6 is a schematic view of the relay pilot regulator of FIG. 1 in conjunction with a main regulator in an alternative gas distribution system.

In FIG. 6 an alternative regulator system 101 is illustrated wherein the main regulator 110 further comprises a partition 112 which blocks the outlet pressure from the outlet side of the main valve 140 from being applied directly to the underside of the main regulator diaphragm 120. Instead, a conduit 113 supplies the outlet pressure from a point downstream on the outlet conduit 143, and this arrangement is preferable if it is desired to monitor the outlet pressure closer to its point of use rather than adjacent the main regulator 110. The alternate arrangement shown in FIG. 6 does not alter the connections with the relay pilot regulator 10, nor the manner in which the regulator system operates. Referring again to FIG. 1, the relay pilot regulator further comprises a relay regulator diaphragm assembly 30 including a flexible diaphragm member 31, a central portion of which is clamped between a central plate 32 and a collared plate 33 defining a relief valve seat 34. A spring 35 extends between the central plate 32 and a threaded collar 36, the position of collar 36 being adjustable to vary the load of spring 35 on the diaphragm assembly 30.

The diaphragm assembly 30 carries a linkage rod 40, and it defines a relief valve disc surface 41 which interfaces the relief valve seat 34 to comprise a relief valve, and further comprises a frustoconical portion 42 which centers the linkage rod and mounts a stem 43. The stem 43 carries a spring collar 44, and a spring 45 extends between the spring collar 44 and the central plate 32 to keep the relief valve normally closed. A rod 46 is adjustably positioned by means of cap 47 such that the rod 46 engages the top of stem 43 when the diaphragm assembly 30 moves upwardly under excessively high pressure, and the engagement between rod 46 and stem 43 permits the valve disc 34 to lift off its seat 33 and bleed off of the high pressure condition. A bleed valve 48 completes a path to atmosphere for pressure relief purposes.

The linkage rod 40 captures a first arm 51 of an L-shaped linkage lever 50 between a ledge 49 and a pin 58. The linkage lever 50 is pivotally mounted to the housing 20 at 52, and the linkage lever 50 further comprises a second arm 53 extending generally upwardly from the pivot mounting point 52 and terminating in a ball 54. The ball 54 engages an unloading valve 60 and a loading valve 80, as more fully discussed below.

The housing 20 and the diaphragm assembly 30 define a chamber 25 to which the adjusted outlet pressure is supplied through conduit 127 at the opening 23. The housing 20 further defines a load/unload passage 26 which communicates with the loading chamber 150 of the main regulator 110 through load/unload conduit 151, and an inlet passage 27 to which the gas at inlet pressure is supplied through inlet conduit 145. An inlet orifice assembly 90 is mounted in the inlet passage 27 wherein the inlet gas is admitted through an orifice 91. The load/unload passage 26 and the inlet passage 27 intersect in the area generally indicated at 15, and this area is connected via an unload passage 28 to the chamber 25. The unloading valve 60 and the loading valve 80 are mounted at the intersection of the passages 26, 27 and 28, and the unloading valve 60 and the loading valve 80 function to selectively:

(1) connect the inlet passage 27 with the load/unload passage 26 to provide increased loading pressure to the loading chamber 150 while blocking the unloading passage 28;
(2) block the inlet pasage 27 and the unload passage 28 to maintain the loading pressure in the loading chamber 150; and
(3) block the inlet passage 27 while connecting the load/unload passage 26 with the unload passage 28 to bleed off gas from the loading chamber and thus decrease the loading pressure.

Figure 3:
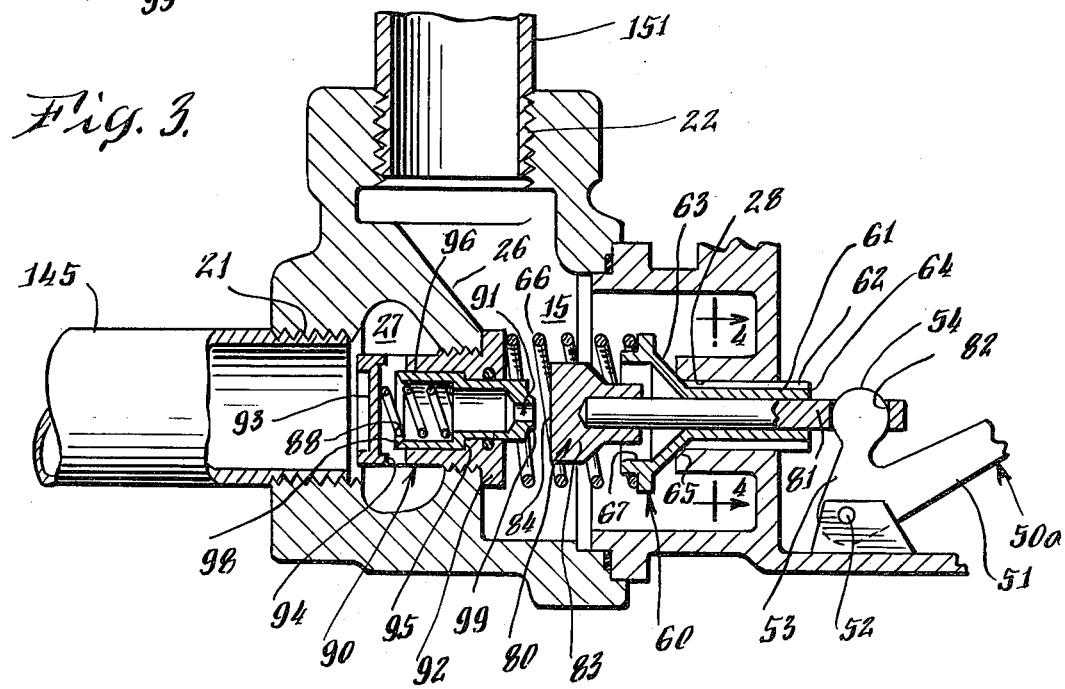
FIG. 3 is a sectional view, partially cut away, of the relay pilot regulator of FIG. 1 showing the loading valve open.
Figure 4:
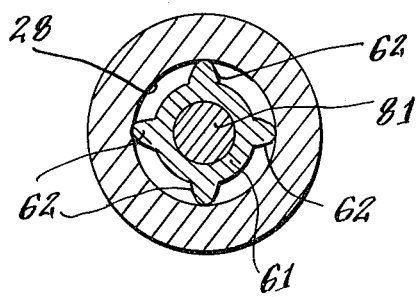
FIG. 4 is a partial sectional view of the relay pilot regulator of FIG. 1 taken along the lines 4—4 of FIG. 3.

More particularly, the unloading valve 60 comprises a tubular valve stem 61 having radially protruding longitudinally extending fins 62 (best seen in FIG. 4), and the tubular valve stem 61 is slideably mounted in the unload passage 28. The unloading valve 60 further comprises a conical valve disc 63, integral with the stem 61, which seats against a valve seat 65 surrounding the entrance to the unload passage 28. The engagement between the valve disc 63 and the valve seat 65 prevents flow of gas along the passage 28 beside the fins 62 when the unloading valve is closed, such as is shown in FIGS. 1 and 3. The unloading valve 60 is biased to its closed position by a valve spring 66 which surrounds a flange 67 of the valve disc 63 at one end and bears against the inlet orifice assembly 90 at its other end.

The loading valve 80 comprises a valve stem 81 which is slideably mounted in the interior of the tubular valve stem 61 of the unloading valve 60. The valve stem 81 protrudes beyond the end 64 of valve stem 61, and defines a slot 82 in which the ball 54 of the linkage lever 50 is received. A valve member 83 including a valve face 84 is secured to the other end of the valve stem 81 with the valve face 84 disposed toward the inlet orifice 91.

Figure 2:
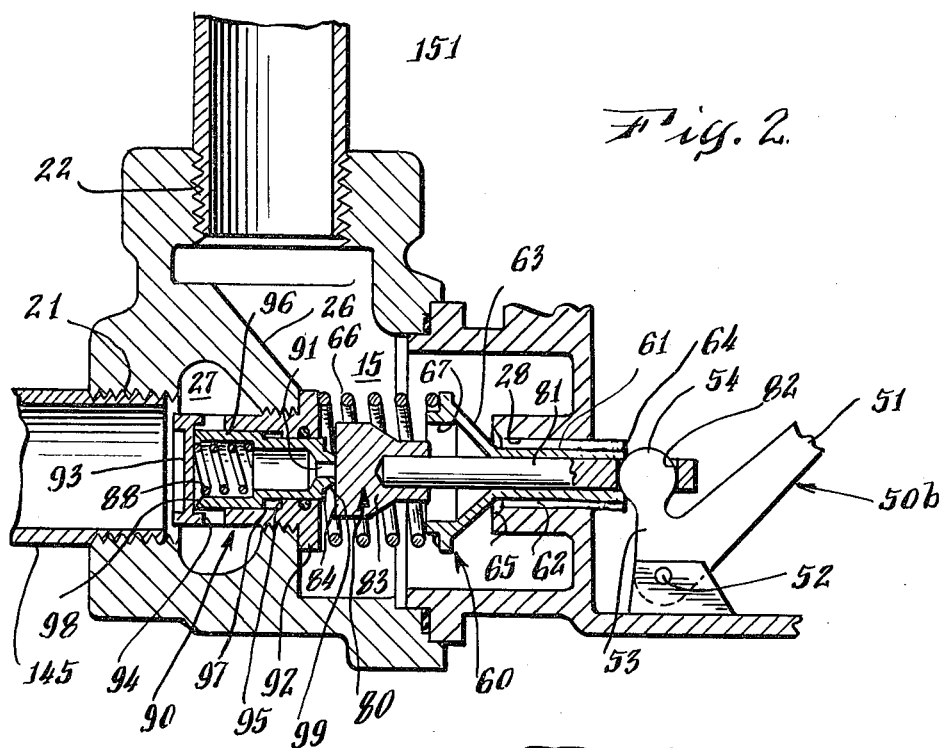
FIG. 2 is a sectional view, partially cut away, of the relay pilot regulator of FIG. 1 showing the unloading valve open.

The inlet orifice assembly 90 comprises a tubular base member 92 which may be screwed into the housing 20 of the relay pilot regulator 10, as illustrated in FIGS. 1–3. The tubular base member 92 is provided with an end plate 93, which also functions as a valve seat, and radially opening ports 94 permit the entry and flow through of gas. A flange 95 is defined upon the interior of the tubular base member 92. A tubular orifice member 96 is slideably received within the tubular base member 92, and the orifice member 96 defines the orifice 91 at one end 99 thereof. The orifice member 96 also defines a flange 97, wherein the orifice member 96 is slideable between a first position shown in FIGS. 1 and 3 wherein the flanges 95 and 97 are engaged and the ports 94 are exposed to permit gas flow through the inlet orifice assembly 90, and a second position shown in FIG. 2 wherein the end 98 of the orifice member 96 is seated against the end plate 93, thereby blocking flow through the inlet orifice assembly 90. A spring 88 biases the orifice member 96 to the first position described above. It should be noted that the other end of the orifice member 96, namely end 99 surrounding and defining the orifice 91, provides the valve seat for valve face 84 of the loading valve 80.

When the diaphragm assembly 30 of the relay pilot regulator 10 is in the position shown in FIG. 1, the linkage lever 50 positions the loading valve 80 such that the valve face 84 is engaged against valve seat 99 surrounding the inlet orifice 91, thus preventing any inflow of gas from the inlet supply line. The ball 54 of the lever linkage 50 is not engaged against the end 64 of the stem 61 of the unloading valve 60, and the unloading valve 60 is, therefore, biased to its closed position by spring 66. Thus, the loading chamber 150 is sealed off by the relay pilot regulator 10 and maintains its pressure. When the diaphragm assembly 30 moves downwardly, thus positioning the linkage lever 50 as shown by the dotted lines 50a in FIG. 1, the loading valve 80 and unloading valve 60 take the positions shown in FIG. 3. In particular, the linkage lever 50 draws valve stem 81 and hence valve face 84 of the loading valve 80 away from its valve seat 99, thus exposing the orifice 91. This permits a flow of gas from the high pressure inlet supply to pass through the inlet orifice assembly 90 and into the load/unload passage 26 to the loading chamber 150. The unloading valve 60 remains closed.

When the diaphragm assembly 30 is driven upwardly, the first arm 51 of the linkage lever 50 is also drawn upwardly as indicated by the lines 50b in FIG. 1, and the valve stem 81 and the valve face 84 of the loading valve 80 are driven against the valve seat 99 surrounding the orifice 91, as shown in FIG. 2. The motion of the loading valve 80 is accommodated by means of the orifice member 96 sliding toward and finally to its second position against spring 88, and in the maximum position shown in FIG. 2 the inlet orifice 91 is doubly blocked by engagement of the valve seat 99 against the valve face 84 and by engagement of the end 98 of the orifice member 96 against the end plate 93 of the inlet orifice assembly 90. In addition, the ball 54 of the linkage lever 50 engages the end 64 of the stem 61 of unloading valve 60, and drives the valve stem 61 to disengage the valve disc 63 from its valve seat 65. Thus, the load/unload passage 26 is connected through the unload passage 28 to the chamber 25 permitting flow of gas from the loading chamber 150 of the main regulator 110.

With reference to the above description of the structural aspects of the relay pilot regulator 10 and its connection in a regulator system 100 with a main regulator 110, the operation of the regulator system 100 will now be described.

When no inlet gas is provided through the gas inlet conduit 142, the main valve 140 is closed by the spring 126 acting upwardly on the linkage rod 125 connected to the main regulator diaphragm 120 and the linkage lever 130. Inasmuch as there is no outlet pressure, the diaphragm assembly 30 of the relay pilot regulator 10 is driven downwardly by spring 35 and the loading valve 80 assumes the open position shown in FIG 3. When a supply of gas at the inlet gas pressure is introduced into conduit 142, the inlet gas is delivered through conduit 145 to the relay pilot regulator 10, and through the inlet orifice assembly 90 and the inlet orifice 91. Because the loading valve 80 is open, the inlet gas is further delivered through the load/unload passage 26 of the relay pilot regulator 10 and conduit 151 to the loading chamber 150 of main regulator 110. Thus, a loading pressure is developed in the loading chamber 150, and the loading pressure acts on the top 122 of the main regulator diaphragm 120 to drive the diaphragm 120 downwardly and open the main valve 140.

This permits a flow of gas through the main valve 140, and an outlet pressure is developed. The outlet pressure is supplied to the underside 121 of the main regulator diaphragm 120 and this pressure, acting together with the force of the spring 126, tends to balance against the loading pressure acting on the top 122 of the main regulator diaphragm 120 to stabilize the position of main valve 140 in a partially open condition. The outlet pressure is also supplied to the underside of the diaphragm assembly 30 of the relay pilot regulator 10, thus driving the diaphragm assembly 30 upwardly and closing the loading valve 80. The spring 35 of the relay pilot regulator 10 is preadjusted via the threaded collar 36 such that the loading valve 80 is closed when the loading pressure is at a level which positions the main valve 140 sufficiently open to provide the desired adjusted outlet pressure. Thus, the regulator system 100 achieves a stable condition delivering gas through outlet conduit 143 at the desired adjusted outlet pressure.

When the outlet pressure drops below the desired level, for instance because of increased downstream demand for gas, the regulator system 100 operates in the following manner to bring the outlet pressure back to the desired adjusted level. First, because the outlet pressure applied to the underside 121 of the main regulator diaphragm 120 drops with the outlet pressure, there is a greater pressure differential across the diaphragm 120 and the diaphragm 120 is driven downwardly to further open the main valve 140. However, the main compensating action is provided by the relay pilot regulator 10, and in particular, the diaphragm assembly 30 drops in response to the decreased outlet pressure, thus opening the loading valve 80 to increase the loading pressure in the loading chamber 150, thereby also increasing the pressure differential across the diaphragm 120 to further open the main valve 140 and restore the outlet pressure to the desired adjusted level. The relay pilot regulator 10 provides a "gain" function, greatly decreasing the reaction time of the regulator system 100 to a low outlet pressure condition and repositioning the main valve to an opening which provides the desired outlet pressure much more quickly than the main regulator alone could do. Also, the use of the relay pilot regulator 10 prevents the main regulator 110 from "cycling" i.e., constantly readjusting the position of the main valve 140 to seek the desired outlet pressure.

When the outlet pressure rises above the desired adjusted level, which may occur when the downstream demand for gas decreases, the diaphragm assembly 30 is driven upwardly and acts to open the unloading valve 60 to vent the loading pressure from the loading chamber 150 to the outlet conduit 143. The main regulator has a similar response to decresed outlet pressure, but the relay pilot regulator increases the speed of the response, thereby providing the desired "gain" function, and prevents the main regulator 110 from "cycling". The unloading valve 80 is normally open only a short period of time and closes in time to maintain a sufficient loading pressure in the loading chamber 150 to prevent the main valve 140 from fully closing.

If the outlet pressure rises to an unacceptably high level at which damage to the regulators or other components of the system might occur, the diaphragm assembly 30 of the relay pilot regulator 10 is driven upwardly until the upper end of rod 43 butts against the lower end of rod 46, thus preventing further upward movement of the linkage rod 40 defining the relief valve disc 41. Further upward movement of the diaphragm assembly 30 lifts the relief valve seat 34 away from the relief valve disc 41, thus venting the excess pressure through the diaphragm assembly 30. The pressure opens the bleed valve 48, and gas escapes to the atmosphere until the excessive pressure condition is relieved.

It will be appreciated that the regulator system 101 of FIG. 6 acts in a similar manner to the regulator system 100 of FIG. 5, except that the outlet pressure is monitored closer to the demand for the gas by means of downstream conduit 113.

In order to be effective, a relay pilot regulator must act quickly, i.e., have fast response, and the relay pilot regulator 10 described above has this desirable characteristic, which is achieved through the use of the concentric combined loading and unloading valves operated by a common linkage lever. Hence, the relay pilot regulator 10 admirably fulfills the object of the invention herein. It will be appreciated that various changes from the above-described preferred embodiment may be made by those skilled in the art without departing from the spirit and scope of the invention, which is limited only by the following claims.

I claim:

1. A relay pilot regulator for use in combination with a main regulator in a gas distribution system, the gas distribution system including an inlet conduit supplying gas at an inlet pressure and an outlet conduit for delivering gas at a reduced outlet pressure, the main regulator including a main valve controlling gas flow from the inlet conduit to the outlet conduit and thereby also controlling the outlet pressure, a main regulator diaphragm mechanically linked to the main valve and a loading chamber the loading pressure in which acts on the main regulator diaphragm wherein the loading pressure positions the main regulator diaphragm and the main valve, the relay pilot regulator comprising:

(A) a housing defining
  (1) an inlet passage connected to the inlet conduit for supplying gas at the inlet pressure,
  (2) a load/unload passage intersecting the inlet passage adjacent the end thereof, the load/unload passage connected to the loading chamber of the main regulator, and
  (3) an unload passage intersecting the load/unload passage adjacent the end thereof, the unload passage and the inlet passage being generally aligned, and the unload passage connected to the outlet conduit;

(B) an unloading valve slideably mounted in the unload passage and slideable between a first closed position blocking the unload passage and a second open position unblocking the unload passage and thereby connecting the unload passage with the load/unload passage for permitting gas to flow from the loading chamber to the outlet conduit;

(C) a loading valve slideably mounted to the unloading valve in the load/unload passage and extending to the inlet passage and slideable between a first closed position blocking the inlet passage and a second open position unblocking the inlet passage and thereby connecting the inlet passage with the unload/load passage for supplying gas from the inlet conduit to the loading chamber;

(D) a relay pilot regulator diaphragm and means for applying the outlet pressure thereto, wherein the relay pilot diaphragm monitors the outlet pressure and moves in response to changes in the outlet pressure;

(E) a mechanical linkage connecting the relay pilot regulator diaphragm to the loading valve and the unloading valve, the relay pilot regulator diaphragm and the mechanical linkage operating to (1) open the loading valve when the outlet pressure is below a given desired outlet pressure, thereby supplying gas at the inlet pressure to the loading chamber of the main regulator for acting on the main regulator diaphragm to open the main valve and increase the outlet pressure to the given desired outlet pressure, (2) close the loading valve when the outlet pressure is at or above the given desired outlet pressure, (3) open the unloading valve when the outlet pressure is above the given desired outlet pressure, thereby decreasing the pressure in the loading chamber and causing the main regulator diaphragm to close the main valve and reduce the outlet pressure to the given desired pressure, and (4) close the unloading valve when the outlet pressure is at or below the given desired outlet pressure.

2. A relay pilot regulator as defined in claim 1 wherein the unloading valve comprises a tubular valve stem having radially protruding longitudinally disposed fins slideably mounting the unloading valve in the unload passage and a valve disc at the end of the valve stem protruding from the unload passage adjacent the intersection of the unload passage with the load/unload passage, the valve disc blocking the unload passage when the unloading valve is in its closed position and unblocking the unload passage when the unloading valve is in its open position to permit gas flow through the unload passage alongside the radially protruding longitudinally disposed fins, said unloading valve spring biased to its closed position, and the tubular valve stem and valve disc defining an axially disposed opening therethrough in which the loading valve is slideably mounted, the loading valve preventing the passage of gas through said opening.

3. A relay pilot regulator as defined in claim 2 wherein the loading valve comprises a valve stem slideably mounted in the axially disposed opening defined by the tubular valve stem and a valve disc of the unloading valve, and the valve stem of the loading valve extends beyond the valve disc of the unloading valve toward the inlet passage and terminates in a valve face which seats to block the inlet passage when the loading valve is in its closed position.

4. A relay pilot regulator as defined in claim 3 and further comprising an inlet orifice assembly defining an inlet orifice and a valve seat surrounding the inlet orifice juxtaposed the valve face of the loading valve, and against which the valve face of the loading valve seats to block the inlet passage, the inlet orifice assembly resiliently mounted in the inlet passage to accommodate further sliding movement of the loading valve after it has closed.

5. A relay pilot regulator as defined in claim 3 wherein the end of the valve stem of the loading valve opposite its valve face extends beyond the end of the valve stem of the unloading valve surrounding it and the valve stem of the loading valve defines a slot adjacent the end of the valve stem of the unloading valve, the slot capturing the mechanical linkage connected with the relay pilot regulator diaphragm, wherein the mechanical linkage is engaged to slide the loading valve between its open and closed positions, and when the loading valve is in its closed position, engages against the stem of the unloading valve to slide it open against its biasing spring.

6. A relay pilot regulator as defined in claim 5 wherein the housing and the relay pilot regulator diaphragm together define a chamber, the unload passage opening into said chamber and the outlet conduit connected to said chamber thereby connecting the unload passage with the outlet conduit and applying the outlet pressure to the relay pilot regulator diaphragm, and wherein the mechanical linkage connecting the relay pilot regulator diaphragm to the loading valve and the unloading valve is mounted within the chamber.

7. A relay pilot regulator as defined in claim 6 wherein said mechanical linkage comprises an L-shaped lever having first and second lever arms and pivotally mounted at the intersection thereof to the housing, the free end of the first of said lever arms terminating in a ball captured in the slot defined by the valve stem of the loading valve, and the free end of the second lever arm captured in a linkage rod mounted to the relay pilot regulator diaphragm.

8. A relay pilot regulator as defined in claim 7 wherein a spring is mounted between an adjustable collar and the relay pilot regulator diaphragm adjustably biasing the relay pilot regulator diaphragm against the outlet pressure, the adjustable collar adjusting the given desired outlet pressure.

9. A relay pilot regulator as defined in claim 8 wherein said relay pilot regulator diaphragm includes a relief valve comprising two normally engaged valve surfaces, one of which is carried by the linkage rod connecting the relay pilot regulator diaphragm with the lever arm and the other of which is carrier by a plate clamped to the relay pilot regulator diaphragm, wherein when the relay pilot regulator diaphragm is exposed to excessively high pressure, the linkage rod is restrained from following the diaphragm and the diaphragm lifts away from the valve seat carried by the linkage rod to relieve the excess pressure.

10. A relay pilot regulator as defined in claim 1 wherein the means for applying the outlet pressure to the relay pilot diaphragm comprises a conduit connected to the outlet conduit at a point substantially downstream of the main regulator.

11. A relay point regulator for use in combination with a main regulator in a gas distribution system, the gas distribution system including an inlet conduit supplying gas at an inlet pressure and an outlet conduit for delivering gas at a reduced outlet pressure, the main regulator including a main valve controlling gas flow from the inlet conduit to the outlet conduit and thereby also controlling the outlet pressure, a main regulator diaphragm mechanically linked to the main valve and a loading chamber the loading pressure in which acts on the main regulator diaphragm wherein the loading pressure positions the main regulator diaphragm and the main valve, the relay pilot regulator comprising:

(A) a housing defining
  (1) an inlet passage connected to the inlet conduit for supplying gas at the inlet pressure,
  (2) a load/unload passage intersecting the inlet passage adjacent the end thereof, the load/unload passage connected to the loading chamber of the main regulator,
  (3) an unload passage intersecting the load/unload passage adjacent the end thereof, the unload passage and the inlet passage being generally aligned with their ends juxtaposed and separated by the end of the load/unload passage,
  (4) a chamber connected to the outlet side of the main valve whereby the outlet pressure is supplied to the chamber, and wherein the unload passage also connected to the chamber;
(B) an unloading valve comprising a tubular valve stem having radially protruding longitudinally extending fins and terminating at one end in a radially protruding valve disc, the unloading valve slideably mounted in the unload passage on its fins with its valve disc disposed at the end of the unload passage juxtaposed the end of the inlet passage and the other end of the valve stem extending into the chamber, the unloading valve slideable between a first closed position wherein its valve disc blocks flow through the unload passage and a second open position permitting flow through the unload passage between the fins of the tubular valve stem, the unloading valve spring biased to its closed position, and the tubular valve stem and the valve disc defining an axial opening therethrough;
(C) a loading valve comprising a valve stem terminating at one end in a valve face, the valve stem slideably mounted in the axial opening defined through the unloading valve with its valve face facing the end of the inlet passage and the other end of the valve stem extending into the chamber beyond the end of the unloading valve stem, the loading valve slideable between a first closed position blocking the inlet passage and a second open position unblocking the inlet passage;
(D) a relay pilot regulator diaphragm mounted in the chamber wherein the outlet pressure is applied thereto, the relay pilot regulator diaphragm spring biased against the outlet pressure for movement in response to changes in the outlet pressure;
(E) a mechanical linkage comprising an L-shaped lever having first and second lever arms mounted to the housing at the intersection thereof, the lever being disposed in the chamber, and the free end of the first lever arm terminating in a ball captured in a slot defined near the end of the valve stem of the loading valve, the ball also sized to engage the end of the tubular valve stem of the unloading valve and the free end of the second lever arm pivotally carried by the relay pilot regulator, whereby movement of the relay pilot regulator diaphragm in response to changes in the outlet pressure pivots to L-shaped lever to (1) open the loading valve when the outlet pressure is below a given desired outlet pressure, thereby supplying gas at the inlet pressure to the loading chamber of te main regulator through the load/unload passage for acting on the main regulator diaphragm to open the main valve and increase the outlet pressure to the given desired outlet pressure,
(2) close the loading valve when the outlet pressure is at or above the given desired outlet pressure,
(3) open the unloading valve when the outlet pressure is above the given desired outlet pressure, thereby decreasing the pressure in the loading chamber by bleeding gas from the loading chamber through the load/unload passage and unload passage and causing the main regulator diaphragm to close the main valve and reduce the outlet pressure to the given desired pressure, and
(4) close the unloading valve when the outlet pressure is at or below the given desired outlet pressure.

* * * * *